United States Patent
Song et al.

(10) Patent No.: US 11,121,374 B2
(45) Date of Patent: Sep. 14, 2021

(54) POSITIVE ELECTRODE FOR LITHIUM SECONDARY BATTERY AND LITHIUM SECONDARY BATTERY INCLUDING SAME

(71) Applicant: LG Chem, Ltd., Seoul (KR)

(72) Inventors: Jooyong Song, Daejeon (KR); In Chul Kim, Daejeon (KR); Juri Kim, Daejeon (KR); Hyun Min Kim, Daejeon (KR)

(73) Assignee: LG Chem, Ltd., Seoul (KR)

(*) Notice: Subject to any disclaimer, the term of this patent is extended or adjusted under 35 U.S.C. 154(b) by 118 days.

(21) Appl. No.: 16/481,006

(22) PCT Filed: Nov. 30, 2018

(86) PCT No.: PCT/KR2018/015109
§ 371 (c)(1),
(2) Date: Jul. 25, 2019

(87) PCT Pub. No.: WO2019/108025
PCT Pub. Date: Jun. 6, 2019

(65) Prior Publication Data
US 2019/0393507 A1  Dec. 26, 2019

(30) Foreign Application Priority Data

Nov. 30, 2017 (KR) .......... 10-2017-0163156
Nov. 29, 2018 (KR) .......... 10-2018-0151235

(51) Int. Cl.
*H01M 4/62* (2006.01)
*H01M 4/04* (2006.01)
(Continued)

(52) U.S. Cl.
CPC .......... *H01M 4/62* (2013.01); *H01M 4/0404* (2013.01); *H01M 4/0445* (2013.01);
(Continued)

(58) Field of Classification Search
CPC .... H01M 4/62; H01M 2/1072; H01M 4/0404; H01M 4/0445
See application file for complete search history.

(56) References Cited

U.S. PATENT DOCUMENTS 6,485,866 B1 * 11/2002 Gauthier .............. H01M 4/667
429/245
10,170,755 B2 * 1/2019 Christensen .......... H01M 4/382
(Continued)

FOREIGN PATENT DOCUMENTS

JP  H05-234621 A  9/1993
JP  2008-159314 A  7/2008
(Continued)

OTHER PUBLICATIONS

Extended European Search Report issued by the European Patent Office dated Mar. 16, 2020 in a corresponding European Application No. 18882604.4.

*Primary Examiner* — Maria Laios
*Assistant Examiner* — Bartholomew A Hornsby
(74) *Attorney, Agent, or Firm* — Morgan, Lewis & Bockius LLP

(57) ABSTRACT

The present disclosure relates to a positive electrode for a lithium secondary battery comprising a positive electrode current collector and a positive electrode active material layer coated and formed on at least one surface of the positive electrode current collector, wherein the positive electrode current collector includes a non-coated portion protruded with no positive electrode active material layer coated thereon, and wherein an irreversible material composed of lithium oxide is coated on the non-coated portion, and a lithium secondary battery including the same.

14 Claims, 2 Drawing Sheets

(51) Int. Cl.
*H01M 4/131* (2010.01)
*H01M 4/134* (2010.01)
*H01M 4/1391* (2010.01)
*H01M 4/38* (2006.01)
*H01M 4/505* (2010.01)
*H01M 4/525* (2010.01)
*H01M 10/0525* (2010.01)
*H01M 50/20* (2021.01)

(52) U.S. Cl.
CPC ........... *H01M 4/131* (2013.01); *H01M 4/134* (2013.01); *H01M 4/1391* (2013.01); *H01M 4/386* (2013.01); *H01M 4/505* (2013.01); *H01M 4/525* (2013.01); *H01M 10/0525* (2013.01); *H01M 50/20* (2021.01)

(56) References Cited

U.S. PATENT DOCUMENTS

| | | | |
|---|---|---|---|
| 10,770,694 B2 * | 9/2020 | Kim | H01M 2/0426 |
| 2009/0325061 A1 * | 12/2009 | Lim | H01M 10/26 |
| | | | 10/52 |
| 2012/0058389 A1 * | 3/2012 | Guen | H01M 2/0237 |
| | | | 429/179 |
| 2012/0328955 A1 * | 12/2012 | Ryu | H01M 4/386 |
| | | | 429/231.95 |
| 2015/0270583 A1 | 9/2015 | Takahashi et al. | |
| 2015/0380721 A1 | 12/2015 | Lee et al. | |
| 2016/0133933 A1 * | 5/2016 | Choi | H01M 4/1391 |
| | | | 429/231.8 |
| 2016/0197346 A1 | 7/2016 | Myung et al. | |
| 2017/0194625 A1 * | 7/2017 | Woehrle | H01M 4/485 |

FOREIGN PATENT DOCUMENTS

| | | |
|---|---|---|
| JP | 2011-082039 A | 4/2011 |
| JP | 2013-206544 A | 10/2013 |
| JP | 5382445 B2 | 1/2014 |
| KR | 10-0868256 B1 | 11/2008 |
| KR | 10-1222345 B1 | 1/2013 |
| KR | 20150004539 A | 1/2015 |
| KR | 10-2017-0030290 A | 3/2017 |
| KR | 10-2017-0053892 A | 5/2017 |
| KR | 10-2017-0057249 A | 5/2017 |
| KR | 10-1768195 B1 | 8/2017 |
| WO | 2011080988 A1 | 7/2011 |
| WO | 2014041622 A1 | 3/2014 |
| WO | 2015/046537 A1 | 4/2015 |

* cited by examiner

POSITIVE ELECTRODE FOR LITHIUM SECONDARY BATTERY AND LITHIUM SECONDARY BATTERY INCLUDING SAME

CROSS-REFERENCES TO RELATED APPLICATIONS

This application is a U.S. national phase application, pursuant to 35 U.S.C. § 371, of PCT/KR2018/015109, filed Nov. 30, 2018, designating the United States, which claims priority to Korean Application No. 10-2017-0163156, filed Nov. 30, 2017, and Korean Application No. 10-2018-0151235, filed Nov. 29, 2018. The entire contents of the aforementioned patent applications are incorporated herein by this reference.

TECHNICAL FIELD

The present disclosure relates to a positive electrode for a lithium secondary battery and a lithium secondary battery including the same, and more particularly, to a positive electrode for a high-energy lithium secondary battery, and a lithium secondary battery including the same

BACKGROUND

In accordance with technological development and increased demand for various devices, demand for using secondary batteries as energy sources has rapidly increased. Among these secondary batteries, lithium secondary batteries having high energy density and voltage, long cycle life, and low self-discharge rate are commercially available and widely used.

In such a lithium secondary battery, lithium-containing cobalt oxides ($LiCoO_2$) having a layered crystal structure, $LiMnO_2$ having a layered crystal structure, $LiMn_2O_4$ having a spinel crystal structure, and lithium-containing nickel oxides ($LiNiO_2$) are generally used as the positive electrode active material. Carbon materials are generally used as negative electrode active materials. Recently, due to an increase in demand for a high-energy lithium secondary battery, a mixed use of a silicon-based material or a silicon oxide-based material having an effective capacity of ten times or higher than an effective capacity of the carbon-based material is under consideration.

Meanwhile, in order to develop high-energy lithium secondary batteries that is a recent trend, use of a negative electrode using a silicon-based material as a negative electrode active material is considered to be essential. However, the negative electrode to which the silicon-based material is applied has a high irreversible capacity, and thus, there is a problem that the charge/discharge efficiency is low.

In order to solve these problems, a method of manufacturing a battery by applying a positive electrode mixed with an additive with a high irreversible capacity such as $Li_2O_2$ has been suggested. However, when the $Li_2O_2$ is decomposed to produce oxygen gas during the first charge, voids are generated in places thereof, and due to the generation of the voids, the density of the positive electrode is decreased after the first charge, which results in a problem that the energy density of the battery is decreased.

SUMMARY

Technical Problem

Therefore, the present invention has been made in an effort to solve the problems that occur when using a positive electrode by mixing a high capacity irreversible additive with a positive electrode active material, and an object of the present disclosure is to provide a positive electrode for a lithium secondary battery wherein in the positive electrode current collector, a high-capacity irreversible material is coated only on a non-coated portion protruded and formed without coating the active material layer, and a lithium secondary battery including the same.

Technical Solution

According to an aspect of the present disclosure, there is provided a positive electrode for a lithium secondary battery including a positive electrode current collector and a positive electrode active material layer coated and formed on at least one surface of the positive electrode current collector, wherein the positive electrode current collector includes a non-coated portion protruded with no positive electrode active material layer coated thereon, and wherein an irreversible material composed of lithium oxide is coated on the non-coated portion.

The irreversible material may decompose after a first charge of the lithium secondary battery including the positive electrode for a lithium secondary battery.

The irreversible material may be $Li_2O_2$, $Li_2O$, or a mixture thereof.

Meanwhile, according to another aspect of the present disclosure, there is provided a lithium secondary battery including: an electrode assembly including a positive electrode, a negative electrode, and a separator interposed between the positive electrode and the negative electrode; a non-aqueous electrolyte for impregnating the electrode assembly; and a battery case that encloses the electrode assembly and the non-aqueous electrolyte, wherein the positive electrode is a positive electrode of the lithium secondary battery according to the present disclosure.

The negative electrode may include a silicon (Si)-based material as the negative electrode active material.

The silicon-based material may be silicon-silicon oxide composite; silicon alloy; or silicon oxide composite and silicon alloy.

Further, according to the present disclosure, there is provided a battery module including the lithium secondary battery of the present disclosure as a unit battery, a battery pack including the battery module, and a device including such a battery pack as a power source.

The device may be an electric vehicle, a hybrid electric vehicle, a plug-in hybrid electric vehicle or a system for power storage.

Advantageous Effects

According to the present disclosure, an irreversible material composed of lithium oxide is coated onto the non-coated portion of the positive electrode current collector, and thus the energy density of the battery may be increased.

In particular, since the irreversible material is coated only on the non-coated portion of the positive electrode current collector, it is possible to solve the problems of void generation that may occur in the positive electrode mixed with the irreversible additive of the prior art, and the decrease in the energy density of the battery.

BRIEF DESCRIPTION OF THE DRAWINGS

The accompanying drawings illustrate preferred embodiments of the present disclosure and, together with the detailed description, serve to provide further understanding of the technical spirit of the present disclosure. However, the present disclosure should not be construed as being limited to the drawings.

DETAILED DESCRIPTION OF THE EMBODIMENTS

Figure 1A:
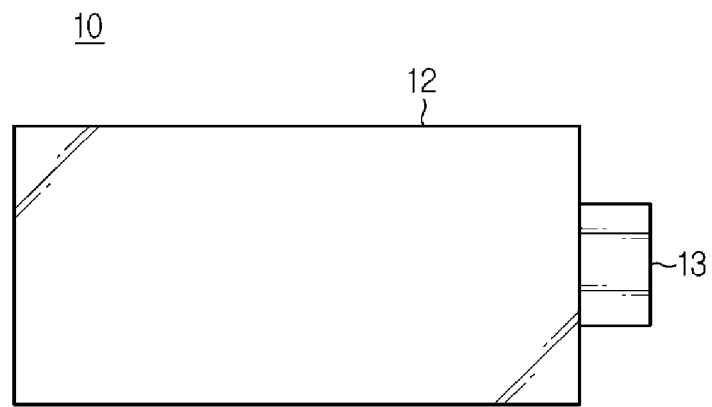
FIGS. 1A and 1B schematically illustrate a plan view and a side view of a conventional positive electrode, respectively.

It should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments disclosed in the present specification and the configurations illustrated in the drawings are merely the most preferred embodiments of the present disclosure, and do not represent the entirety of the technical ideas of the present disclosure, and thus it should be understood that there may be various equivalents and modified examples that could substitute therefore at the time of filing the present application.

For the development of high energy lithium secondary batteries that meet the needs of the industry, the use of a negative electrode in which a silicon-based material is applied as a negative electrode active material is required. However, since such a negative electrode has a high irreversible capacity and thus a low charge/discharge efficiency, a positive electrode mixed with a high-capacity irreversible additive has been used to solve these problems.

Figure 1B:
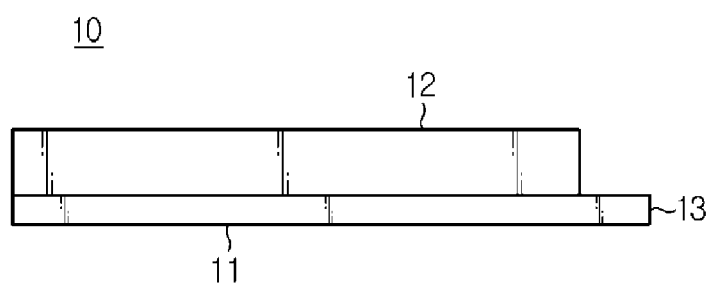

FIGS. 1A and 1B schematically illustrate a plan view and a side view of a conventional positive electrode, respectively. Referring to FIGS. 1A and 1B, a high-capacity irreversible additive is mixed in the positive electrode active material layer 12 formed on the positive electrode current collector 11. Further, the positive electrode current collector 11 includes a non-coated portion 13 with no positive electrode active material layer coated thereon. Through the first charge, a high-capacity irreversible additive dispersed within the positive electrode active material layer 12 is decomposed to generate voids in places thereof. As a result, the density of the positive electrode active material layer 12 is decreased, and consequently, the energy density of the battery is decreased.

In the present disclosure, it is possible to solve the problems of the prior art by coating an irreversible material only on the non-coated portion of the positive electrode current collector without mixing the positive electrode active material and the high-capacity irreversible additive.

Figure 2A:
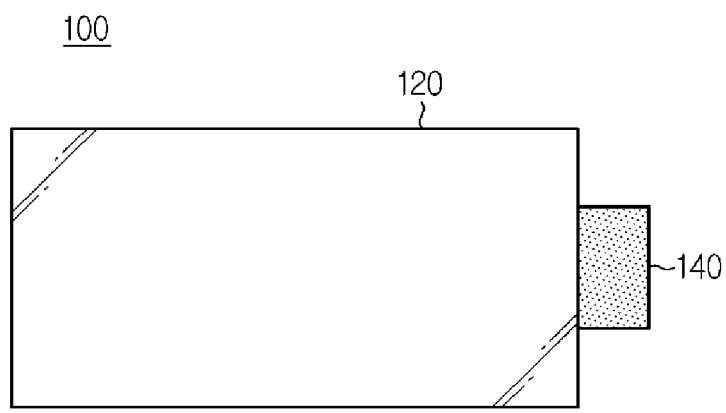
FIGS. 2A and 2B schematically illustrate a plan view and a side view of a positive electrode according to an embodiment of the present disclosure, respectively.
Figure 2B:
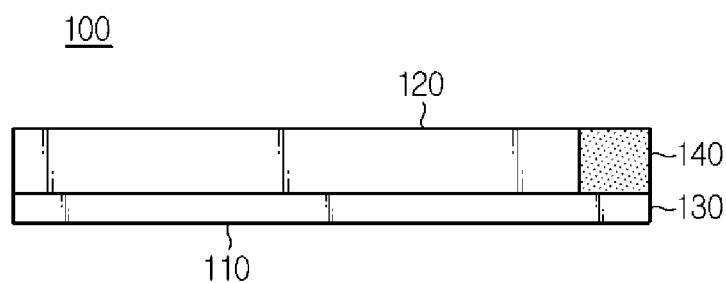
Figure 3:
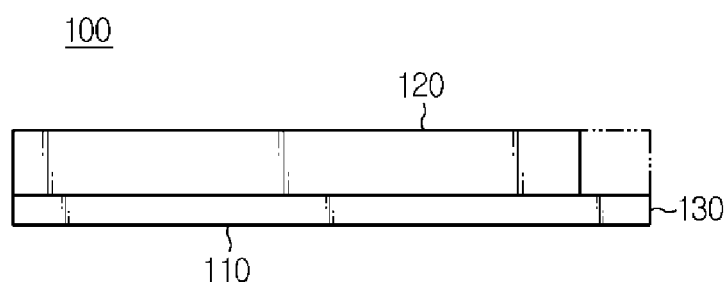
FIG. 3 schematically illustrates a side view of a positive electrode after charge according to an embodiment of the present disclosure.

FIGS. 2A and 2B schematically illustrate a plan view and a side view of a positive electrode according to an embodiment of the present disclosure, respectively. FIG. 3 schematically illustrates a side view of a positive electrode after charge according to an embodiment of the present disclosure.

The present disclosure will be described in more detail with reference to the figures. The positive electrode 100 for lithium secondary batteries includes a positive electrode current collector 110 and a positive electrode active material layer 120 coated and formed on at least one surface of the positive electrode current collector 110, wherein the positive electrode current collector 110 includes a non-coated portion 130 protruded while no positive electrode active material layer 120 is coated thereon, and wherein an irreversible material 140 composed of lithium oxide is coated on the non-coated portion 130.

Since the irreversible material 140 composed of lithium oxide is coated only on the non-coated portion 130 and is not included in the positive electrode active material layer 120, a process of mixing the positive electrode active material and the irreversible material is unnecessary. In particular, the irreversible material 140 composed of lithium oxide disappears after the first charge of the lithium secondary battery containing the positive electrode 100 for lithium secondary batteries. Therefore, after the first charge, the non-coated portion 130 is present in the form without a coating layer thereon. In particular, the irreversible material 140 composed of lithium oxide may be decomposed to lithium ions and oxygen gas, and may be removed.

The irreversible material may be $Li_2O_2$, $Li_2O$, or a mixture thereof.

The irreversible material 140 may be coated only on the non-coated portion 130 in a state of being dissolved in an organic solvent, and subsequently dried. The irreversible material may be coated to a thickness that corresponds to a thickness of the positive electrode active material layer 120, for example, 10 to 300 μm, or 50 to 250 μm, and subsequently, may be dried to remove the organic solvent.

As the irreversible material 140 is coated and dried to such a thickness, even in the case where a silicon-based material is used for the negative electrode, it is possible to reduce the deterioration in characteristics of the positive electrode while effectively offsetting the imbalance in irreversible capacity of the two electrodes.

Meanwhile, the positive electrode active material included in the positive electrode active material layer may include a lithium transition metal oxide represented by the following chemical formula 1 or 2.

$$Li_xM_yMn_{1-y}O_{2-z}A_z \qquad (1)$$

wherein,

M is at least one element selected from the group consisting of Al, Mg, Ni, Co, Fe, Cr, V, Ti, Cu, B, Ca, Zn, Zr, Nb, Mo, Sr, Sb, W, Ti and Bi;

A is at least one anion having a −1 or −2 valency; and 0.9≤x≤1.2, 0<y<2, and 0≤z<0.2.

$$(1-x)LiM'O_{2-y'}A_{y'}-xLi_2MnO_{3-y'}A_{y'} \qquad (2)$$

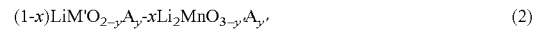

wherein,

M' is $Mn_aM_b$;

M is at least one selected from the group consisting of Ni, Ti, Co, Al, Cu, Fe, Mg, B, Cr, Zr, Zn and Period II transition metals;

A is at least one selected from the group consisting of anions such as $PO_4$, $BO_3$, $CO_3$, F and $NO_3$;

0<x<1, 0<y≤0.02, 0<y'≤0.02, 0.5≤a≤1.0, 0≤b≤0.5, a+b=1.

Meanwhile, the positive electrode active material layer may further include a binder and a conductive material.

Further, the positive electrode is manufactured by coating an electrode mixture, which is a mixture of a positive electrode active material, a conductive material and a binder, onto a portion excluding a non-coated portion of the positive electrode current collector. Depending on necessity, a filler may be further added to the mixture.

In addition to the lithium transition metal oxide represented by the chemical formula 1 or 2, the positive electrode active material may include layered compounds such as lithium cobalt oxide ($LiCoO_2$) or lithium nickel oxide ($LiNiO_2$) or compounds substituted with one or more transition metals; lithium manganese oxides such as the formulas $Li_{1+x}Mn_{2-x}O_4$ (wherein, x is 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxides represented by the formula $LiNi_{1-x}M_xO_2$ (wherein, M=Co, Mn, Al, Cu, Fe, Mg, B or Ga, x=0.01 to 0.3); lithium manganese composite oxides represented by the formula $LiMn_{2-x}M_xO_2$ (wherein, M=Co, Ni, Fe, Cr, Zn or Ta, x=0.01 to 0.1) or $Li_2Mn_3MO_8$ (wherein, M=Fe, Co, Ni, Cu or Zn); lithium manganese composite oxide having a spinel structure represented by $LiNi_xMn_{2-x}O_4$; $LiMn_2O_4$ where some of Li atoms in the formula are substituted with alkaline earth metal ions; disulfide compounds; $Fe_2(MoO_4)_3$; and the like, but are not limited thereto.

The positive electrode current collector is generally manufactured to have a thickness of 3 to 500 μm. The positive electrode current collector is not particularly limited as long as it has high conductivity without inducing any chemical changes in the battery. For example, stainless steel, aluminum, nickel, titanium, calcinated carbon, or a surface treated material of aluminum or stainless steel with carbon, nickel, titanium, silver or the like may be used. The current collector may include fine irregularities on a surface thereof to increase the adhesion strength of the positive electrode active material, and it may be used in various shapes such as a film, a sheet, a foil, a net, a porous body, a foam, a non-woven fabric, and the like.

The conductive material is generally added in an amount of 1 to 50% by weight based on the total weight of the mixture containing the positive electrode active material. The conductive material is not particularly limited as long as it has conductivity without inducing any chemical changes in the battery. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive material.

Further, the binder is a component that improves bonding between the active material and the conductive material or the like and bonding to the current collector, and is usually added in an amount of 1 to 50% by weight based on the total weight of the mixture that contains the positive electrode active material. Examples of these binders include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers.

Furthermore, the filler is optionally used as a component to inhibit positive electrode expansion. The filler is not particularly limited as long as it is a fibrous material that does not cause chemical changes in the battery. Examples of the filler include olefin-based polymers such as polyethylene and polypropylene; and fibrous materials such as glass fiber and carbon fiber.

The positive electrode active material layer may be manufactured by coating an electrode mixture containing the above-described respective components on a current collector in a slurry state, and drying it.

More specifically, such an active material layer may be formed by coating the above-mentioned mixture with a thickness of 10 to 300 μm or 50 to 250 μm and subsequently drying it to remove the organic solvent, thereby allowing it to exhibit appropriate characteristics.

Meanwhile, according to another aspect of the present disclosure, a lithium secondary battery includes an electrode assembly including a positive electrode, a negative electrode, and a separator interposed between the positive electrode and the negative electrode; a non-aqueous electrolyte for impregnating the electrode assembly; and a battery case that encloses the electrode assembly and the non-aqueous electrolyte, wherein the positive electrode is a positive electrode according to the present invention as described above.

In particular, the negative electrode may include a silicon (Si)-based material as a negative electrode active material, and such a silicon-based material may be a silicon-silicon oxide composite and/or a silicon alloy. More specific examples of the silicon-based material include at least one selected from the group consisting of $SiO_x(0 \leq x < 2)$, pure Si, and Si-alloy.

Further, the negative electrode active material may further include a carbon-based material, and the carbon-based material may include not less than 70% by weight and not more than 99.9% by weight based on the total weight of the negative electrode active material. Further, the carbon-based material may be at least one selected from the group consisting of artificial graphite, natural graphite, amorphous hard carbon, low-crystalline soft carbon, carbon black, acetylene black, Ketjen black, Super-P, graphene and fibrous carbon. In particular, it may be crystalline artificial graphite and/or crystalline natural graphite, On the other hand, in addition to the carbon-based material and the silicon-based material, the negative electrode active material may include $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, Group 2, Group 3 elements, halogen; metal complex oxides such as $0 < x \leq 1$; $1 \leq y \leq 3$; $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni based material; titanium oxide; lithium titanium oxide, and the like, but is not limited thereto.

Further, the negative electrode current collector constituting the negative electrode is generally manufactured to have a thickness of 3 to 500 μm. Such negative electrode current collector is not particularly limited as long as it has high conductivity without inducing any chemical changes in the battery. For example, copper, stainless steel, aluminum, nickel, titanium, calcined carbon, copper or stainless steel that are surface-treated with carbon, nickel, titanium, silver or the like, an aluminum-cadmium alloy, and the like may be used. Further, similarly to the positive electrode current collector, the negative electrode current collector may include fine irregularities on its surface to increase the adhesion force of the negative electrode active material, and it can be used in various shapes such as a film, a sheet, a foil, a net, a porous body, a foamed body, a non-woven fabric, and the like.

Meanwhile, the separator is interposed between the positive electrode and the negative electrode, and an insulating thin film having high ion permeability and mechanical strength is used. A pore diameter of the separator is generally 0.01 to 10 μm, and a thickness thereof is generally 5 to 300 μm. For example, olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator.

The non-aqueous electrolytic solution is composed of a non-aqueous electrolyte and a lithium salt. As the non-aqueous electrolyte, non-aqueous organic solvents, organic solid electrolytes, inorganic solid electrolytes, and the like are used, but the present disclosure is not limited thereto.

As examples of the non-aqueous organic solvent, non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate may be used.

Further, examples of the organic solid electrolyte include polyethylene derivatives, polyethylene oxide derivatives, polypropylene oxide derivatives, phosphoric acid ester polymers, agitation lysine, polyester sulfide, polyvinyl alcohols, polyvinylidene fluoride, and polymers containing ionic dissociation groups.

Further, examples of the inorganic solid electrolyte include nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

Further, the lithium salt is a material that is readily soluble in the non-aqueous electrolyte. Examples thereof include, but are not limited to, $LiCl$, $LiBr$, $LiI$, $LiClO_4$, $LiBF_4$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, imides, and the like.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the lithium salt-containing non-aqueous electrolyte. If necessary, in order to impart incombustibility, the electrolyte may further include halogen-containing solvents, such as carbon tetrachloride and ethylene trifluoride. Furthermore, in order to improve high-temperature storage characteristics, the electrolyte may further include carbon dioxide gas, and may further include fluoro-ethylene carbonate (FEC), propene sultone (PRS), or the like.

In one specific example, a lithium salt such as $LiPF_6$, $LiClO_4$, $LiBF_4$, and $LiN(SO_2CF_3)_2$ is added to a mixed solvent of a cyclic carbonate of EC or PC which is a high-dielectric solvent and a linear carbonate of DEC, DMC or EMC which is a low viscosity solvent to thereby prepare a lithium salt-containing non-aqueous electrolyte.

Meanwhile, according to another aspect of the present disclosure, there is provided a battery module including the lithium secondary battery as a unit battery, a battery pack including the battery module, and a device including such a battery pack as a power source.

Examples of the device may include an electric vehicle, a hybrid electric vehicle, a plug-in hybrid electric vehicle or a system for power storage, but are not limited thereto.

Hereinafter, the present disclosure will be described in detail by way of examples to help the understanding of the present disclosure. However, the examples according to the present disclosure may be modified in a variety of different forms, and it should be understood that interpretation of the scope of the present disclosure is not limited to the following embodiments. The examples of the present disclosure are provided to person having ordinary skill in the art for the a clearer and complete description.

Example 1

(1) Preparation of Positive Electrode Mixture

A positive electrode active material Li ($Ni_{0.8}Co_{0.1}Mn_{0.1}$)$O_2$, a conductive material (carbon black, trade name: Super C65, Timcal) and a binder (PVDF, trade name: KF1100, Kureha) were mixed in a weight ratio of 80:8:12, and dry-mixed in a mortar to prepare a positive electrode mixture of Example 1.

(2) Preparation of Positive Electrode

An organic solvent (NMP) was added to the positive electrode mixture of Example 1 to form a slurry phase, which was then coated on the aluminum current collector to a thickness of 200 μm and vacuum-dried in a vacuum oven at 120° C. for 12 hours.

Subsequently, a mixed solution of lithium peroxide ($L_2O_2$) and an organic solvent (NMP) (having a content of $L_2O_2$ of 80 wt % in 100 wt % of the total weight of the mixed solution) was coated on the non-coated portion of the current collector, and vacuum-dried in a vacuum oven at 120° C. for 12 hours. As a result, the positive electrode of Example 1 was obtained.

(3) Preparation of Lithium Secondary Battery

A negative electrode active material mixture of silicon-based active material SiO and artificial graphite in a weight ratio of 15:85, a conductive material (carbon black, trade name: Super C65, Timcal), a binder (SBR, trade name A544, ZEON), and a thickener (CMC, Daicell 2200, Daicell) were mixed in a weight ratio of 94.2:2:2.5:1.3, and dry-mixed to prepare a negative electrode mixture.

An organic solvent (NMP) was added to the positive electrode mixture of Example 1 to form a slurry phase, which was then coated on the copper current collector and vacuum-dried in a vacuum oven at 150° C. for 12 hours. Thereby, a negative electrode was prepared.

A separator made of PP/PE material having a thickness of 9 μm and a porosity of 42 vol was interposed between the prepared negative electrode and positive electrode, was inserted into a battery container, and the electrolyte was injected therein. A lithium secondary battery was manufactured in the form of 2032 full-cells according to a conventional manufacturing method.

As for the electrolyte, one in which a 1 M ($LiPF_6$) solution was dissolved in a mixed solvent having a volume ratio of EC:DMC:DEC of 1:2:1 (1M $LiPF_6$ in EC:DMC:DEC=1:12:1 (v/v/v) was used.

Comparative Example 1

(1) Preparation of Positive Electrode Mixture

A positive electrode active material Li(Ni$_{0.8}$Co$_{0.1}$Mn$_{0.1}$)O$_2$, lithium peroxide (Li$_2$O$_2$): a conductive material (carbon black, trade name: Super C65, Timcal) and a binder (PVDF, trade name: KF1100, Kureha) were mixed in a weight ratio of 64:16:8:12, and dry-mixed in a mortar to prepare a positive electrode mixture of Comparative Example 1.

(2) Preparation of Positive Electrode

An organic solvent (NMP) was added to the positive electrode mixture of Comparative Example 1 to form a slurry phase, which was then coated on the aluminum current collector and vacuum-dried in a vacuum oven at 120° C. for 12 hours. As a result, the positive electrode of Comparative Example 1 was obtained.

(3) Preparation of Positive Electrode and Lithium Secondary Battery

The positive electrode of Comparative Example 1 was used instead of the positive electrode of Example 1 and the remainder of the steps was performed in the same manner in Example 1 to prepare a positive electrode and a lithium secondary battery.

Experimental Example 1

Evaluation of Initial Charge and Discharge Characteristics of Battery I

The initial charge and discharge characteristics of the batteries of Example 1 and Comparative Example 1 were evaluated at room temperature under the following conditions.

Charge: 0.01 C, CC/CV, 4.6V, 5% cut-off
Discharge: 0.01 C, CC, 2.5V, cut-off

As a result of the evaluation, it was confirmed that the initial charge capacity of Example 1 was 904 mAh/g, and the initial charging capacity of Comparative Example 1 was 254 mAh/g.

In Comparative Example 1 and Example 1, lithium peroxide (Li$_2$O$_2$) may be generally applied to the positive electrode to compensate for the irreversible additive capacity of the negative electrode.

The lithium peroxide (Li$_2$O$_2$) is a compound that is capable of irreversibly releasing 2 moles of lithium ions together with 1 mole of oxygen per mole of lithium peroxide (Li$_2$O$_2$) theoretically based on the following reaction formula 1.

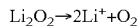

$$Li_2O_2 \rightarrow 2Li^+ + O_2 \qquad \text{[Reaction Formula 1]}$$

However, according to the results of the initial charge capacity evaluation, it was confirmed that, in the high voltage region of 4.3V or higher for example, the battery of Example 1 in which the lithium peroxide (Li$_2$O$_2$) was coated on the non-coated portion has a higher initial charge capacity of the positive electrode compared with Comparative Example 1 in which lithium peroxide (Li$_2$O$_2$) was applied in a state of being blended with the positive electrode active material.

In Example 1, as the reduction decomposition reaction of the lithium peroxide (Li$_2$O$_2$) was performed in the non-coated portion, it does not affect the positive active material layer (in other words, forms no voids inside the positive active material layer), and is terminated by the disappearance of the coating layer on the non-coated portion. Therefore, the loss of electrode density in the positive electrode active material layer and the reduction of the energy density of the entire battery may be non-existent or minimal.

In contrast, in Comparative Example 1, since the reduction decomposition reaction of lithium peroxide (Li$_2$O$_2$) occurs in the positive electrode active material layer, voids are formed in the positive electrode active material layer, and a decrease in electrode density and a decrease in energy density may occur.

As a result, in Example 1, while effectively offsetting the imbalance of irreversible capacity of the two electrodes, the initial charge capacity of the positive electrode is high, the loss of energy density in the positive electrode is small, and excellent lifetime characteristics may be obtained, as compared with Comparative Example 1.

EXPLANATION OF SYMBOLS 10, 100: positive electrode for lithium secondary battery
11, 110: positive electrode collector
12, 120: positive electrode active material layer
13, 130: non-coated portion
140: irreversible material

What is claimed is:

1. A positive electrode for a lithium secondary battery comprising a positive electrode current collector and a positive electrode active material layer coated and formed on at least one surface of the positive electrode current collector,
   wherein the positive electrode current collector includes a non-coated portion protruded with no positive electrode active material layer coated thereon,
   wherein an irreversible material composed of lithium oxide is coated only on the non-coated portion, and
   wherein the irreversible material comprises Li$_2$O$_2$, Li$_2$O, or a mixture thereof.

2. The positive electrode for a lithium secondary battery of claim 1, wherein the irreversible material decomposes after a first charge of the lithium secondary battery including the positive electrode for a lithium secondary battery.

3. The positive electrode for a lithium secondary battery of claim 1, wherein the irreversible material is coated to a thickness of 10 to 300 μm.

4. A lithium secondary battery comprising:
   an electrode assembly including a positive electrode, a negative electrode, and a separator interposed between the positive electrode and the negative electrode;
   a non-aqueous electrolyte for impregnating the electrode assembly; and
   a battery case that encloses the electrode assembly and the non-aqueous electrolyte,
   wherein the positive electrode is the positive electrode for the secondary battery of claim 1.

5. The lithium secondary battery of claim 4 comprising a silicon (Si)-based material as the negative electrode active material.

6. The lithium secondary battery of claim 5, wherein the silicon-based material is silicon-silicon oxide composite; silicon alloy; or silicon oxide composite and silicon alloy.

7. A battery module comprising the lithium secondary battery of claim 4 as a unit battery.

8. A battery pack comprising the battery module of claim 7.

9. A device comprising the battery pack of claim 8 as a power source.

10. The device of claim 9, wherein the device is an electric vehicle, a hybrid electric vehicle, a plug-in hybrid electric vehicle or a system for power storage.

11. A method of fabricating a positive electrode for the lithium secondary battery of claim 1, the method comprising:
- coating a positive electrode current collector with a positive electrode active material layer except on a non-coated portion that protrudes from the positive electrode current collector;
- coating an irreversible material including lithium oxide only on the non-coated portion of the positive electrode current collector,
- wherein the irreversible material comprises $Li_2O_2$, $Li_2O$, or a mixture thereof.

12. The method of claim 11, further comprising:
decomposing the irreversible material by a first charge of the lithium secondary battery, and allowing the irreversible material to be removed after the first charge.

13. The method of claim 11, wherein the irreversible material is coated to a thickness that corresponds to a thickness of the positive electrode active material layer.

14. The method of claim 13, wherein the thickness of the irreversible material is 10 to 300 μm.

* * * * *